United States Patent
Calo et al.

(10) Patent No.: US 11,228,488 B2
(45) Date of Patent: *Jan. 18, 2022

(54) SOFTWARE IMPLEMENTATION OF NETWORK SWITCH/ROUTER

(71) Applicant: International Business Machines Corporation, Armonk, NY (US)

(72) Inventors: Séraphin Calo, Cortlandt Manor, NY (US); Erich M. Nahum, New York, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/745,585

(22) Filed: Jan. 17, 2020

(65) Prior Publication Data

US 2020/0153691 A1   May 14, 2020

Related U.S. Application Data

(63) Continuation of application No. 15/974,376, filed on May 8, 2018, now Pat. No. 10,608,876, which is a
(Continued)

(51) Int. Cl.
*H04L 12/50* (2006.01)
*H04L 12/24* (2006.01)
(Continued)

(52) U.S. Cl.
CPC .......... *H04L 41/0816* (2013.01); *H04L 41/12* (2013.01); *H04Q 11/0005* (2013.01);
(Continued)

(58) Field of Classification Search
CPC ..... H04L 12/50; H04L 12/52; H04L 41/0803; H04L 41/0813; H04L 41/0816;
(Continued)

(56) References Cited

U.S. PATENT DOCUMENTS 5,754,120 A * 5/1998 Argentati ................ H04L 49/25
                                                          340/2.22
6,294,928 B1 * 9/2001 Lytle ..................... H03K 19/177
                                                          326/34
(Continued)

*Primary Examiner* — Dmitry Levitan
(74) *Attorney, Agent, or Firm* — Scully, Scott, Murphy & Presser, PC; Vazken Alexanian, Esq.

(57) ABSTRACT

A network switching system and method and a computer program product for operating a network switch are disclosed. The network switch includes a multitude of input ports and a multitude of output ports. In one embodiment, one processing device is assigned to each of the input ports and output ports to process data packets received at the input ports and transferred to the output ports. In one embodiment, the method comprises creating an intermediate adjustable configuration of processing devices functionally between the input ports and the output ports, and assigning the processing devices of the intermediate configuration to forward the data packets from the input ports to the output ports to obtain a balance between latency and synchronization of the transfer of the data packets from the input ports to the output ports. In an embodiment, software is used to create and to adjust dynamically the intermediate configuration.

20 Claims, 3 Drawing Sheets

Related U.S. Application Data continuation of application No. 13/861,850, filed on Apr. 12, 2013, now Pat. No. 10,092,226.

(51) Int. Cl.
*H04Q 11/00* (2006.01)
*H04L 12/931* (2013.01)

(52) U.S. Cl.
CPC ........ *H04L 49/00* (2013.01); *H04Q 2011/005* (2013.01); *H04Q 2011/0045* (2013.01)

(58) Field of Classification Search
CPC ..... H04L 41/0843; H04L 41/12; H04L 49/00; H04Q 11/0005
USPC ........ 370/357, 360, 388, 389, 400, 408, 422
See application file for complete search history.

(56) References Cited

U.S. PATENT DOCUMENTS

| | | |
|---|---|---|
| 6,813,274 B1 | 11/2004 | Suzuki et al. |
| 6,914,902 B2 * | 7/2005 | Ayandeh ................ H04Q 3/68 370/372 |
| 6,961,342 B1 | 11/2005 | Uzun et al. |
| 6,976,088 B1 | 12/2005 | Gai et al. |
| 6,992,980 B2 | 1/2006 | Brezzo et al. |
| 7,154,902 B1 | 12/2006 | Sikdar |
| 7,161,906 B2 | 1/2007 | Dell et al. |
| 7,167,481 B2 * | 1/2007 | Steele ................ H04L 49/1515 370/230 |
| 7,356,025 B2 * | 4/2008 | Bohm ..................... H04Q 3/68 370/388 |
| 7,545,757 B2 | 6/2009 | Di Benedetto et al. |
| 7,573,826 B1 | 8/2009 | Beshai et al. |
| 7,701,849 B1 | 4/2010 | Ma |
| 7,864,757 B2 | 1/2011 | Hall et al. |
| 8,019,630 B2 * | 9/2011 | Dale ..................... G06Q 10/025 705/5 |
| 8,572,615 B2 * | 10/2013 | Inoue ................ G06F 15/17325 718/100 |
| 10,218,629 B1 * | 2/2019 | An ......................... H04L 45/22 |
| 2002/0080823 A1 | 6/2002 | Wolf et al. |
| 2006/0209816 A1 | 9/2006 | Li et al. |
| 2010/0161793 A1 | 6/2010 | Young Hwan et al. |
| 2012/0044948 A1 | 2/2012 | Nachum et al. |

* cited by examiner

SOFTWARE IMPLEMENTATION OF NETWORK SWITCH/ROUTER

CROSS REFERENCE TO RELATED APPLICATIONS

This application is a continuation of U.S. patent application Ser. No. 15/974,376, filed May 8, 2018, which is a continuation of U.S. patent application Ser. No. 13/861,850, filed Apr. 13, 2013. The entire contents and disclosure of U.S. patent application Ser. Nos. 15/974,376 and 13/861,850 are hereby incorporated herein by reference.

BACKGROUND

This invention generally relates to network switching, and more specifically, to a network switch having a reconfigurable topology. Embodiments of the invention relate to a software implementation of network switching.

A network switch is a data switching device that forwards a data unit, typically of the type referred to as a "packet," from a source network component to a destination network component. Typically, a network switch receives a packet from the source network component via an input port and sends the packet to the destination network component via an output port.

Network switches and routers are implemented in hardware using a combination of ASICs/FPGAs and some software. The function of the software is primarily to control the operation of hardware elements like the ASICs and FPGAs. Since hardware based ASICs and FPGAs are more difficult to produce and configure, this creates a relatively inflexible architecture for the system. As the workload on a switch changes and different amounts of traffic flow from a given input port to a given output port, the hardware interconnection does not change.

BRIEF SUMMARY

Embodiments of the invention provide a network switching system and method and a computer program product for operating a network switch. The network switch includes a multitude of input ports and a multitude of output ports. In one embodiment, one hardware processing device is assigned to each of the input ports and output ports to process data packets received at the input ports and transferred to the output ports. In one embodiment, the method comprises creating an intermediate adjustable configuration of hardware processing devices functionally between the input ports and the output ports, and assigning the hardware processing devices of the intermediate adjustable configuration to forward the data packets from the input ports to the output ports to obtain a balance between latency and synchronization of the transfer of the data packets from the input ports to the output ports.

In an embodiment, a defined software program is implemented on one or more hardware processing devices to create the intermediate adjustable configuration.

In an embodiment, the defined software program is also implemented for adjusting the intermediate configuration to maintain said balance.

In one embodiment, one or more defined parameters are monitored to measure at least one of said latency and said synchronization, and the intermediate configuration is adjusted in response to specified changes to the one or more defined parameters.

In an embodiment, the adjustable configuration connects each of the output ports to each of the input ports.

In one embodiment, the adjustable configuration includes a multitude of k-ary tree structures, and each of the k-ary tree structures connects a respective one of the output ports to all of said multitude of input ports.

In an embodiment, at least some of the k-ary tree structures includes one or more intermediate tiers of the hardware processing devices.

In one embodiment, one or more tiers of the hardware processing cores are added to one or more of the k-ary tree structures to increase the synchronization of the transfer of the data packets.

In an embodiment, one or more of said tiers are eliminated to reduce the latency of the transfer of the data packets.

In one embodiment, a respective one hardware processing core, of a first group of hardware processing cores, is assigned to each of the input ports and output ports; and said intermediate configuration is created from a second group of hardware processing cores.

Embodiments of the invention, in order to perform an all software switching architecture, divide and subdivide the number of inbound ports and outbound ports into hierarchical groups. The software is implemented so that each core reads from a single queue, and the grouping is done so that the number of cores writing into a queue is minimized. Depending on the number of cores available, the need for synchronization can be eliminated completely.

Current solutions use a variety of hardware and mixed software solutions. Since hardware based ASICs and FPGAs are more difficult to produce and configure, this creates a relatively inflexible architecture for the system. As the workload on a switch changes and different amounts of traffic flow from a given input port to a given output port, the hardware interconnection does not change. The software implementation of embodiments of the invention, however, can adjust and flexibly adapt the interconnection to the current workload.

DETAILED DESCRIPTION

Figure 1:
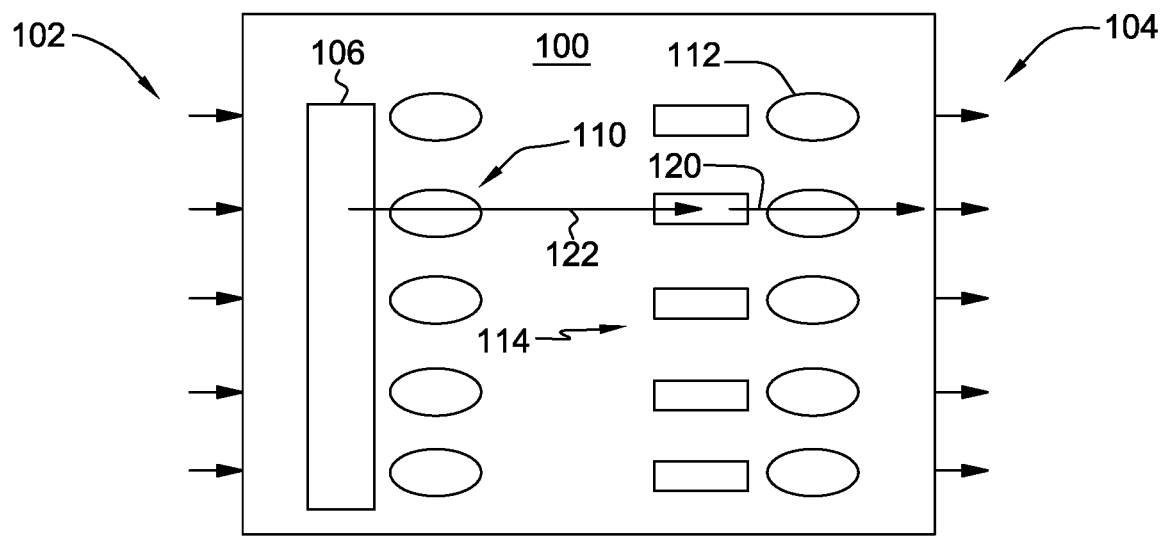
FIG. 1 illustrates a prior art network switch.

FIG. 1 illustrates a conventional network switching element 100 comprising a plurality of input ports 102, a plurality of output ports 104, memory 106, and a plurality of processing elements 110 and 112.

The function of a network switch or a router can be described as that of copying packets from a set of input ports to a set of (usually equal number of) output ports. In current architectures, there are two common techniques to do such a routing function, one is via a shared memory system, and the other is via an interconnection network. Each packet arriving at the input port the packet has information in its header which can be used to determine which output port is supposed to go to.

In the shared memory system, the packets that come in are copied into a common memory location 106. There are typically queues 114 at the outbound ports and processing elements at each of the input ports and output ports. The task of the processing element 112 at the output port is to copy the packets at the output queue into the output line connecting to the port, as represented at 120. The task of the processing element 110 at the input port is to queue information about the packet in shared memory at the correct outbound queue, as represented at 122. This copying and queuing of the packets requires some synchronization and blocking for the access to the outbound queue.

In an interconnection network architecture, queuing happens at the input ports (as opposed to the output port queues in shared memory architecture). The input ports are connected to the output ports either by a multi-stage interconnection network or by a fully connected cross-bar switch. The interconnection network includes a series of smaller switches which route packets from one port to another. Blocking and queuing of packets may happen in interconnection architecture at the input port of a switch if the desired output port is being used to transmit packets currently coming from another input port.

Figure 2:
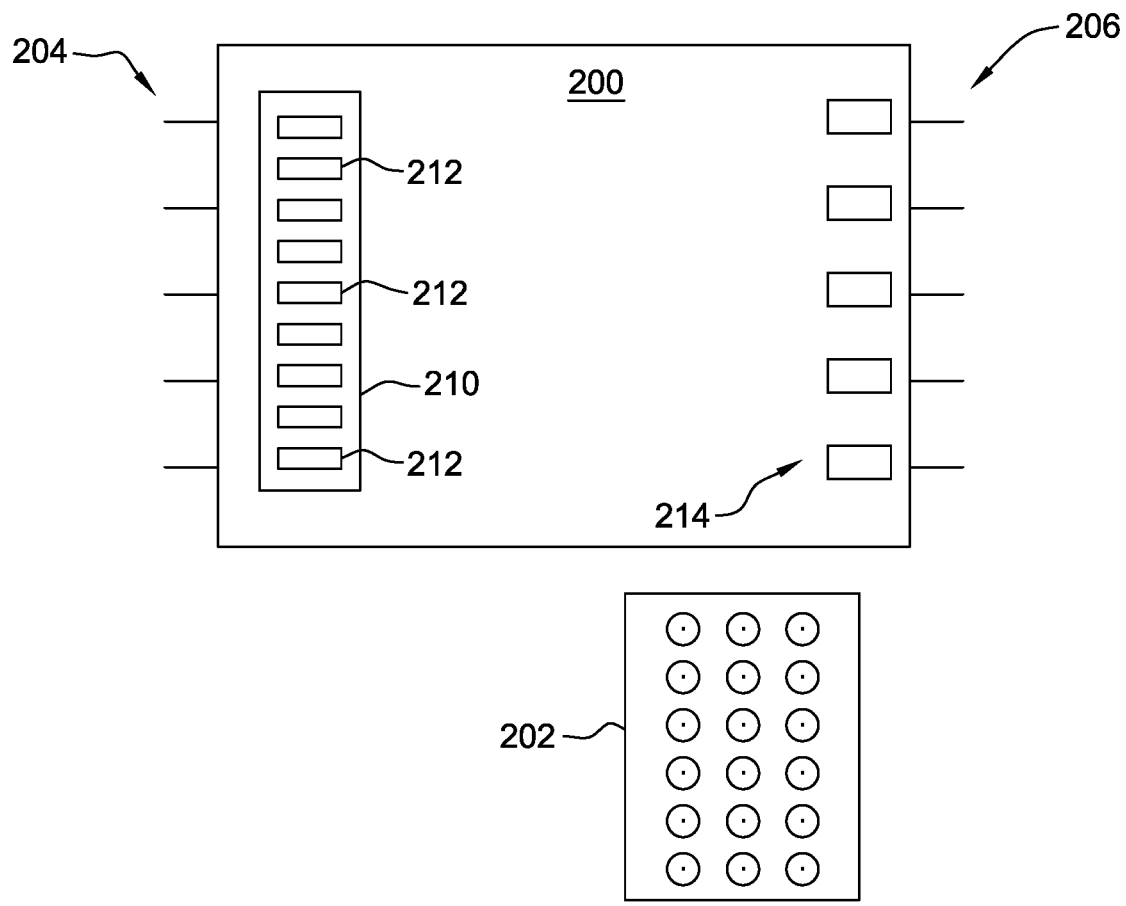
FIG. 2 shows a network switch in accordance with an embodiment of the invention.

In a highly multicore processor architecture, the task of switching, which is normally performed by the hardware systems can be performed efficiently by means of software. FIG. 2 illustrates a network switching architecture 200 designed, in accordance with an embodiment of the invention, to use multi-core processors 202 to perform switching. Architecture 200 comprises a plurality of input ports 204, a plurality of output ports 206, and memory 210. In this architecture, the processor cores 202 are not part of the switch 200, but are part of the computer system in which or with which the switch is used.

In order that the switching happens at a low latency, the software may be designed so there is no swapping out among different threads running on a single core. This can be achieved by designing the system so that a single software thread runs on each core.

Within this architecture, there is now the challenge of taking packets arriving from multiple input ports 204 and then forwarding the packets to different output ports 206 using the available threads. In embodiments of the invention, the following architecture is used for achieving this goal. Each of a group of the processor cores 220 runs a software thread which is associated with an inbound queue 212. The queue 212 can be implemented by dedicating a module of shared memory to each processor core, or can be implemented by a separate memory module privately associated with the processor core.

If, for example, there are N input ports and N output ports, and the number of available processor cores for forwarding packets is greater than 2×N, then each input port is assigned to one of the cores and each output port is assigned to one of the remaining cores. When the processor core assigned to an input port 204 finds a packet in that port's inbound queue 212, the processor core takes that packet out of the inbound queue, determines output port for the packet, and puts that packet into the queue of 214 the outbound port. Since multiple processor cores may be sending packets to the queue of the same output port, a processor core may block transfer of the data packets to synchronize inserting packets into the outbound queues 214.

In order to avoid such blocking due to locking, the switch 200 can be designed so that there are N queues associated with each of the outbound ports, resulting in $N^2$ total queues for each outbound port. At each outbound port, one of the queues is dedicated to the task of receiving packets from the corresponding input port. The software at the processor core assigned to the output port picks up packets from the queues of the inbound port in a round-robin manner and puts them on the outbound port. However, such selection of packets from multiple input queues is not maximally efficient, in that a lot of clock cycles can be spent checking for the presence of packets in inbound queues that may be empty.

In order to avoid thrashing due to the needs of many threads to synchronize their operation, or unnecessary checking for packets in queues that will be empty, embodiments of the invention provide an architecture that is both efficient as well as agile. In general, effective synchronization can be done within a limited number of threads. For example, a relatively efficient synchronization can be achieved as long as the number of threads that are competing for access to a queue is less than a threshold K, where K is much smaller than the number of input/output ports N. In these cases, a K-ary tree structure of processor cores is created for each output port leading from the N input ports. For each output port, $(N-K)/(K-1)$ additional cores are used to create such a structure. The total switch would then include $N(N-K)/(K-1)$ cores in addition to the 2*N input and output cores to perform the switching function.

Figure 3:
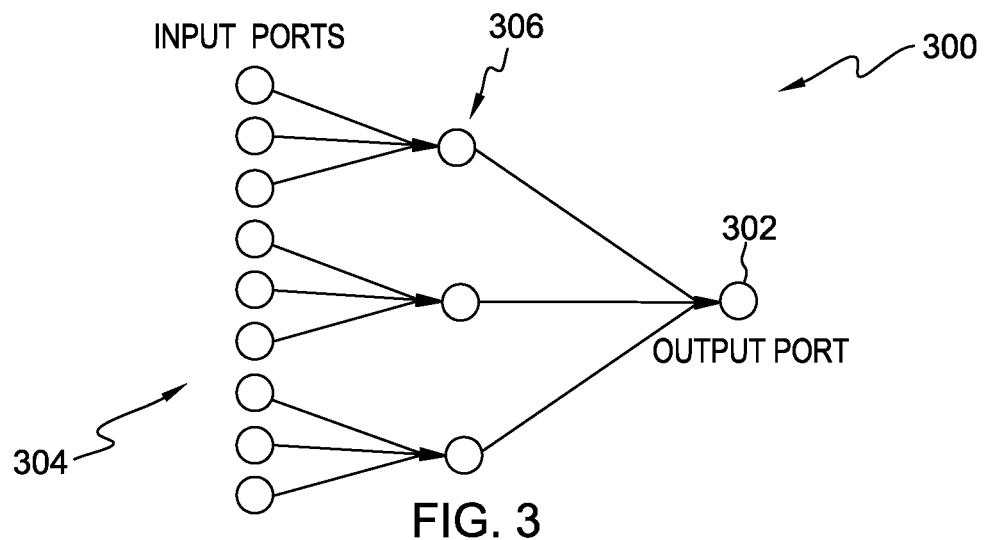
FIG. 3 shows an example of a topology configuration that may be used with the switch of FIG. 2.

An example of such a configuration with K=3 nodes for a 9×9 input switch is shown at 300 in FIG. 3. The output port is represented at 302, the input ports are represented at 304, and the additional processor cores that are used to create the K-ary tree structure are shown at 306. This configuration is repeated for each of the output ports. Thus, the entire switch includes 45 cores, with 9 cores for the input ports, 9 cores for the output cores, and 3*9=27 cores for the intermediary forwarding functions.

In a hardware embodiment, such an interconnection is generally static and can not be changed. However, in software instances, the interconnection topology can be changed. The number of tiers of processor cores that are intervening between the input and output ports can be reduced or increased depending on the actual work in the queue and the contention for synchronization. If there is a lot of contention between the input for any core, that contention can be alleviated by adding another tier with an intervening core, and if contention is very low, some of the tiers can be eliminated.

Figure 4:
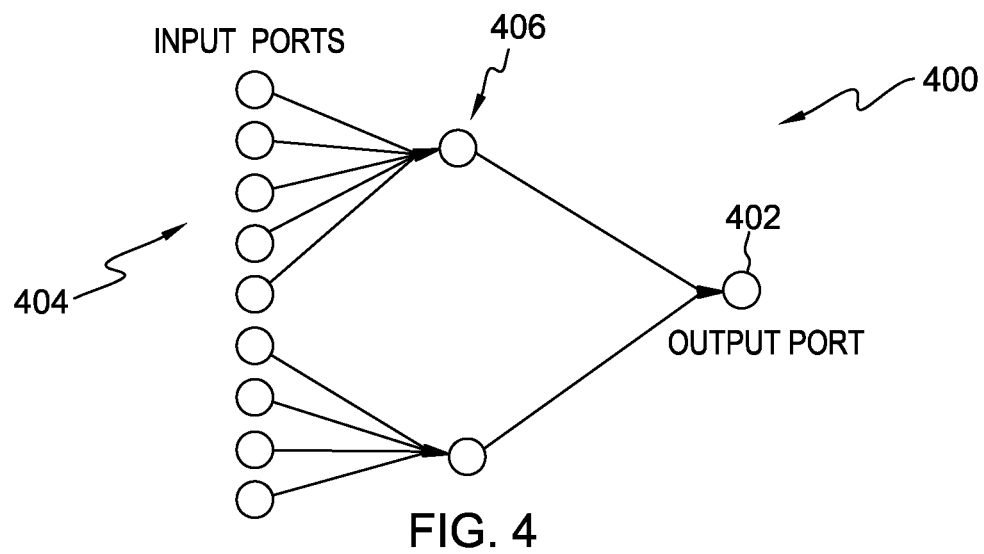
FIG. 4 illustrates an alternate topology configuration that may be used with the switch of FIG. 2.

Thus, in embodiments of the invention, the configuration topology for one output port may look as shown in FIG. 3, while the topology for another port may look as shown in FIG. 4. In this configuration 400, the output port is represented at 402, the input ports are represented at 404, and the additional processor cores that are used to create the K-ary tree structure are shown at 406.

Figure 5:
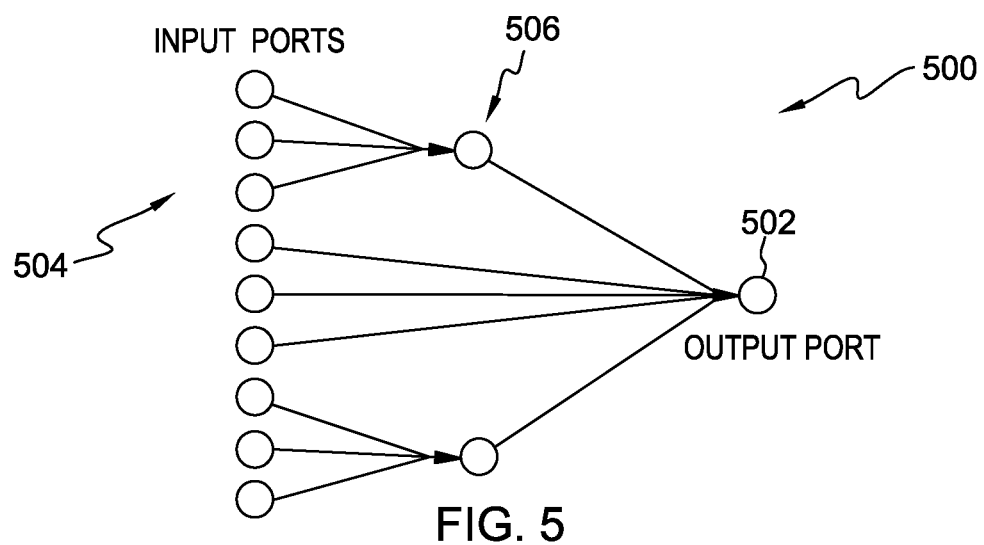
FIG. 5 depicts another topology that may be used in the network switch of FIG. 2.

The configuration topology for yet another output port may be as shown at 500 in FIG. 5. The output port is represented at 502, the input ports are represented at 504, and the additional processor cores that are used to create the K-ary tree structure are shown at 506.

In order to create this adaptive behavior, each processor core can keep track of the amount of times different input cores provide input to the inbound queue or need to wait for synchronization. If this count exceeds a threshold, then an additional tier with one or more cores can be included to reduce the overhead of synchronization. On the other hand, if there is not contention for synchronization, or the load is low, then the latency of a tier can be eliminated by having data packets be written to the next level of the tier—assuming that tier is not overloaded. This adjustment can be done dynamically and functions can be given to the loads.

By dynamically adjusting the topology of forwarding packets in this manner, an all software switch implementation can be done to obtain the optimum or desired balance between the switching latency and synchronization overhead of the system, and to automatically adjust to the appropriate or desired configuration.

Instead of starting from an initial tree-based configuration as described above, embodiments of the invention can initially start from another configuration, e.g. a interconnection model of CLOS interconnected switches, or a fully cross-bar interconnection architecture, and then the tiers of cores between the input and output ports can be dynamically adjusted depending on load.

Thus, this model provides for a self-adjusting interconnect which can obtain the optimal or desired performance of switching depending on how the workload pattern changes.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 6:
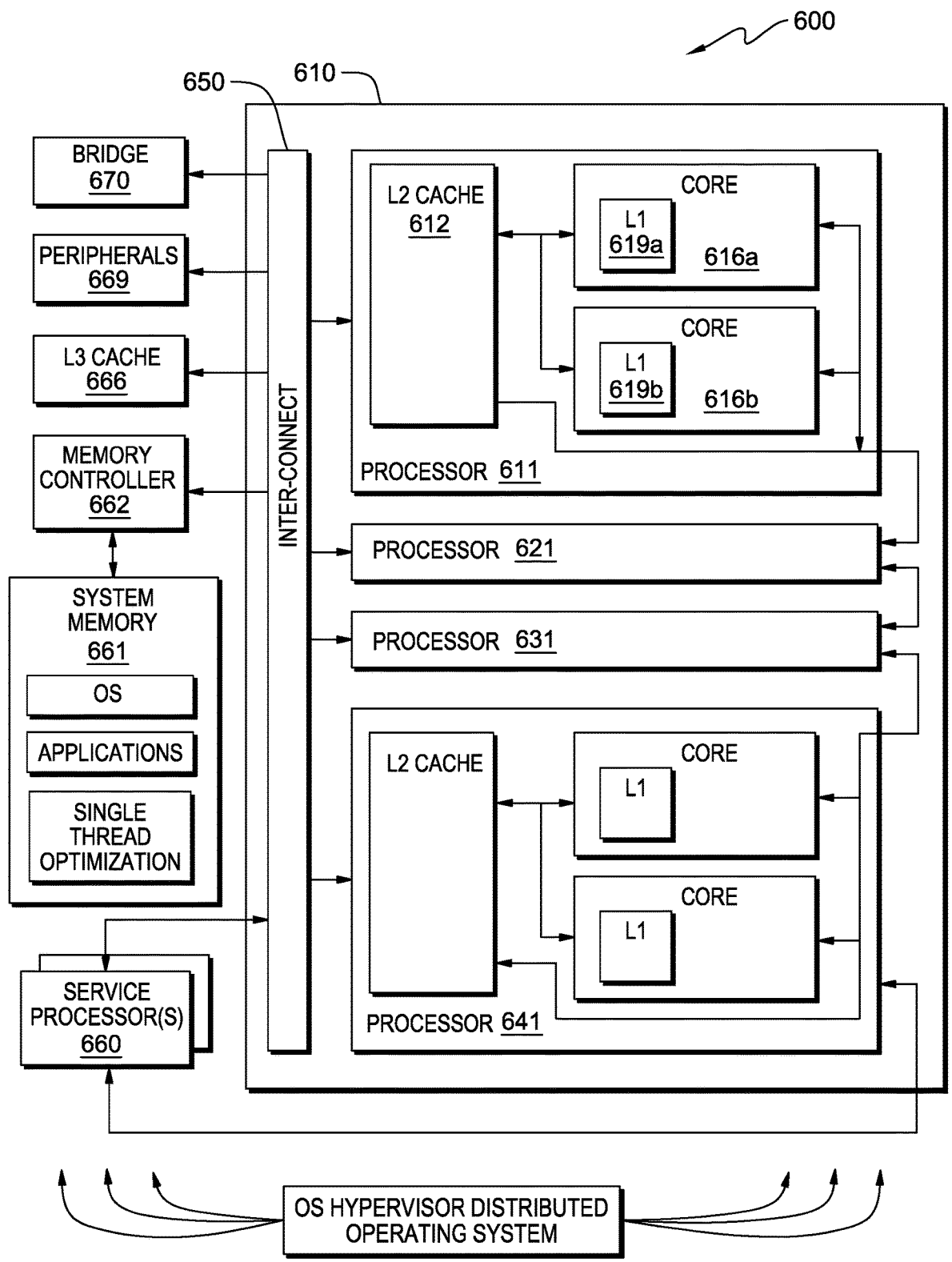
FIG. 6 depicts a computer system that may be used with the network switch of FIG. 1.

FIG. 6 illustrates a high-level block diagram of a multiprocessor (MP) data processing system 100 in which or with which selected embodiments of the present invention may be implemented. The data processing system 100 has one or more processing units arranged in one or more processor groups, and as depicted, includes four processing units 611, 621, 631, 641 in processor group 610. In a symmetric multi-processor (SMP) embodiment, all of the processing units 611, 621, 631, 641 are generally identical—that is, they all use a common set or subset of instructions and protocols to operate, and generally have the same architecture. As shown with processing unit 611, each processing unit may include one or more processor cores 616*a*, 616*b* which carry out program instructions in order to operate the computer.

An exemplary processing unit would be the POWER5™ processor marketed by International Business Machines Corporation that comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 6, each processor core 616a, 616b includes an on-board (L1) cache memory 619a, 619b (typically, separate instruction and data caches) that is constructed from high-speed memory devices. Caches are commonly used to temporarily store values that might be repeatedly accessed by a processor, in order to speed up processing by avoiding the longer step of loading the values from system memory 661. A processing unit can include another cache such as a second level (L2) cache 612 which, along with a cache memory controller (not shown), supports both of the L1 caches 619a, 619b that are respectively part of cores 616a and 616b.

Additional cache levels may be provided, such as an L3 cache 666 which is accessible via fabric bus 650. Each cache level, from highest (L1) to lowest (L3) can successively store more information, but at a longer access penalty. For example, the on-board L1 caches (e.g., 619a) in the processor cores (e.g., 616a) might have a storage capacity of 128 kilobytes of memory, L2 cache 612 might have a storage capacity of 4 megabytes, and L3 cache 666 might have a storage capacity of 132 megabytes. To facilitate repair/replacement of processing unit components, each processing unit 611, 621, 631, 641 may be constructed in the form of a replaceable circuit board, pluggable module, or similar field replaceable unit (FRU), which can be easily swapped, installed in, or swapped out of system 100 in a modular fashion.

The processing units communicate with other components of system 600 via a system interconnect or fabric bus 650. Fabric bus 650 is connected to one or more service processors 660, a system memory device 661, a memory controller 662, a shared or L3 system cache 666, and/or various peripheral devices 669. A processor bridge 670 can optionally be used to interconnect additional processor groups. Though not shown, it will be understood that the data processing system 600 may also include firmware which stores the system's basic input/output logic, and seeks out and loads an operating system from one of the peripherals whenever the computer system is first turned on (booted).

As depicted in FIG. 6, the data processing system 600 includes multiple system resources (e.g., cache memories, memory controllers, interconnects, I/O controllers, etc) which are shared among multiple threads.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention. The invention may be implements in various embodiments with various modifications as are suited to the particular use contemplated.

What is claimed is:

1. A method of operating a network switch including a number of input ports and a number of output ports, the method comprising:
assigning one processing device to each of the input ports and output ports to process data packets received at the input ports and transferred to the output ports;
creating an intermediate adjustable topological configuration of intermediate processing devices functionally arranged in one or more tiers between the input ports and the output ports for transferring the data packets from the input ports to the output ports, including creating a multitude of tree structures connecting the output ports to the input ports, each of the tree structures including a number of the intermediate processing devices less than a specified threshold, said specified threshold being less than the number of input ports and less than the number of output ports in the network switch, and wherein said transferring includes a switch latency for the transferring of the data packets from the input ports to the output ports, and a synchronization of the data packets to reduce contention of the data packets for the intermediate processing devices;
assigning the intermediate processing devices of the intermediate adjustable configuration to forward the data packets from the input ports to the output ports in accordance with a specified configuration topology of the intermediate processing devices;
adding additional tiers of the intermediate processing devices in the intermediate adjustable configuration if a given condition is met, to adjust said synchronization; and
eliminating one or more of the tiers of the intermediate processing devices in the intermediate adjustable configuration if another given condition is met, to adjust the switch latency.

2. The method according to claim 1, wherein:
the number of output ports in the network switch is N; and
each of the tree structures includes (N-K)/(K-1), where K is less than N.

3. The method according to claim 2, wherein K=3.

4. The method according to claim 1, wherein different ones of the tree structures include different numbers of the intermediate processing devices.

5. The method according to claim 1, wherein one of the tree structures includes three of the intermediate processing devices, and another one of the tree structures includes two of the intermediate processing devices.

6. The method according to claim 1, wherein a same one of the tree structures is repeated for each of the output ports.

7. The method according to claim 1, wherein the creating a multitude of tree structures includes creating one of the tree structures for each of the output ports.

8. The method according to claim 7, wherein the creating a multitude of tree structures further includes creating a respective one of the tree structures for each of the output ports.

9. The method according to claim 1, wherein each of the tree structures connects a respective one of the output ports to all of said number of input ports.

10. The method according to claim 1, wherein at least some of the tree structures includes one or more intermediate tiers of the intermediate processing devices.

11. A network switching system, comprising:
a network switch including a number of input ports and a number of output ports; and
one or more processing devices implementing a defined software program and configured for:
assigning one processing device to each of the input ports and output ports to process data packets received at the input ports and transferred to the output ports;
creating an intermediate adjustable topological configuration of intermediate processing devices functionally arranged in one or more tiers between the input ports and the output ports for transferring the data packets from the input ports to the output ports, including creating a multitude of tree structures connecting the output ports to the input ports, each of the tree structures including a number of the intermediate processing devices less than a specified threshold, said specified threshold being less than the number of input ports and less than the number of output ports in the network switch, and wherein said transferring includes a switch latency for the transferring of the data packets from the input ports to the output ports, and a synchronization of the data packets to reduce contention of the data packets for the intermediate processing devices;

assigning the intermediate processing devices of the intermediate adjustable configuration to forward the data packets from the input ports to the output ports in accordance with a specified configuration topology of the intermediate processing devices;

adding additional tiers of the intermediate processing devices in the intermediate adjustable configuration if a given condition is met, to adjust said synchronization; and eliminating one or more of the tiers of the intermediate processing devices in the intermediate adjustable configuration if another given condition is met, to adjust the switch latency.

12. The network switching system according to claim 11, wherein:
the number of output ports in the network switch is N; and each of the tree structures includes (N-K)/(K-1), where K is less than N.

13. The network switching system according to claim 12, wherein K=3.

14. The network switching system according to claim 11, wherein different ones of the tree structures include different numbers of the intermediate processing devices.

15. The network switching system according to claim 11, wherein one of the tree structures includes three of the intermediate processing devices, and another one of the tree structures includes two of the intermediate processing devices.

16. An article of manufacture comprising:
at least one tangible computer readable non-transitory hardware device having computer readable program code logic tangibly embodied therein to operate a network switch including a number of input ports and a number of output ports, and wherein one hardware processing device is assigned to each of the input ports and output ports to process data packets received at the input ports and transferred to the output ports, the computer readable program code logic, when executing, performing the following:

creating an intermediate adjustable topological configuration of intermediate hardware processing devices functionally arranged in one or more tiers between the input ports and the output ports for transferring the data packets from the input ports to the output ports, including creating a multitude of tree structures connecting the output ports to the input ports, each of the tree structures including a number of the intermediate processing devices less than a specified threshold, said specified threshold being less than the number of input ports and less than the number of output ports in the network switch, and wherein said transferring includes a switch latency for the transferring of the data packets from the input ports to the output ports, and a synchronization of the data packets to reduce contention of the data packets for the intermediate processing devices;

assigning the intermediate hardware processing devices of the intermediate adjustable configuration to forward the data packets from the input ports to the output ports in accordance with a specified configuration topology of the intermediate processing devices;

adding additional tiers of the intermediate processing devices in the intermediate adjustable configuration if a given condition is met, to adjust said synchronization; and eliminating one or more of the tiers of the intermediate processing devices in the intermediate adjustable configuration if another given condition is met, to adjust the switch latency.

17. The article of manufacture according to claim 16, wherein:
the number of output ports in the network switch is N; and each of the tree structures includes (N-K)/(K-1), where K is less than N.

18. The article of manufacture according to claim 17, wherein K=3.

19. The article of manufacture according to claim 16, wherein different ones of the tree structures include different numbers of the intermediate processing devices.

20. The article of manufacture according to claim 16, wherein one of the tree structures includes three of the intermediate processing devices, and another one of the tree structures includes two of the intermediate processing devices.

* * * * *